United States Patent [19]

Yonkers

[11] 4,202,561
[45] May 13, 1980

[54] COLLAPSIBLE BICYCLE

[76] Inventor: Edward H. Yonkers, 83 Eldredge St., Newton, Mass. 02150

[21] Appl. No.: 911,375

[22] Filed: Jun. 1, 1978

Related U.S. Application Data

[63] Continuation-in-part of Ser. No. 823,708, Aug. 11, 1977, abandoned.

[51] Int. Cl.² ............................................. B62K 15/00
[52] U.S. Cl. .................... 280/278; 280/279; 280/281; 280/287
[58] Field of Search ............... 280/281, 287, 278, 279; 180/25 A

[56] References Cited

U.S. PATENT DOCUMENTS

| | | | |
|---|---|---|---|
| 1,584,314 | 5/1926 | Mamiya | 280/278 |
| 1,626,775 | 5/1927 | Appelian et al. | 280/278 |
| 1,863,859 | 6/1932 | Kraeft | 280/278 |
| 2,482,472 | 9/1949 | Fried | 280/287 |
| 3,419,283 | 12/1968 | Newland | 280/278 |
| 3,448,997 | 6/1969 | Kosugi | 280/281 |
| 3,572,757 | 3/1969 | Camps | 280/278 |
| 3,623,749 | 11/1971 | Jensen | 280/278 |
| 3,990,717 | 11/1976 | Best | 280/287 |

FOREIGN PATENT DOCUMENTS 21656 of 1904 United Kingdom ..................... 280/278

Primary Examiner—Richard A. Bertsch
Assistant Examiner—Donn McGiehan
Attorney, Agent, or Firm—Wolf, Greenfield & Sacks

[57] ABSTRACT

A collapsible wheeled vehicle having a frame which includes a head tube and bottom bracket interconnected by a down tube. A seat tube, chain stay and strut are pivotally mounted on the bottom bracket. A first cable is connected at one end to the head tube and extends to the end of the chain stay with the intermediate portion of the cable engaging the strut. A second cable is also connected to the head tube and chain stay at its opposite ends, and the intermediate portion of the second cable is connected to the seat tube. When the cables are detached from the strut and seat tube, the vehicle may be collapsed.

32 Claims, 23 Drawing Figures

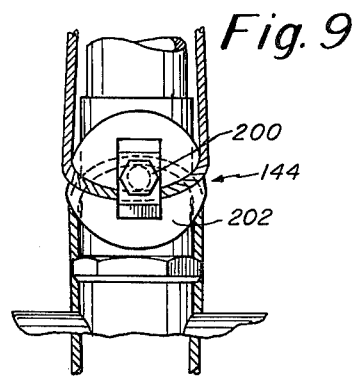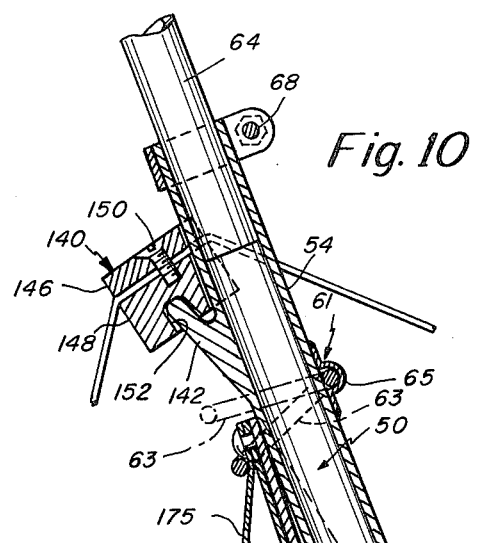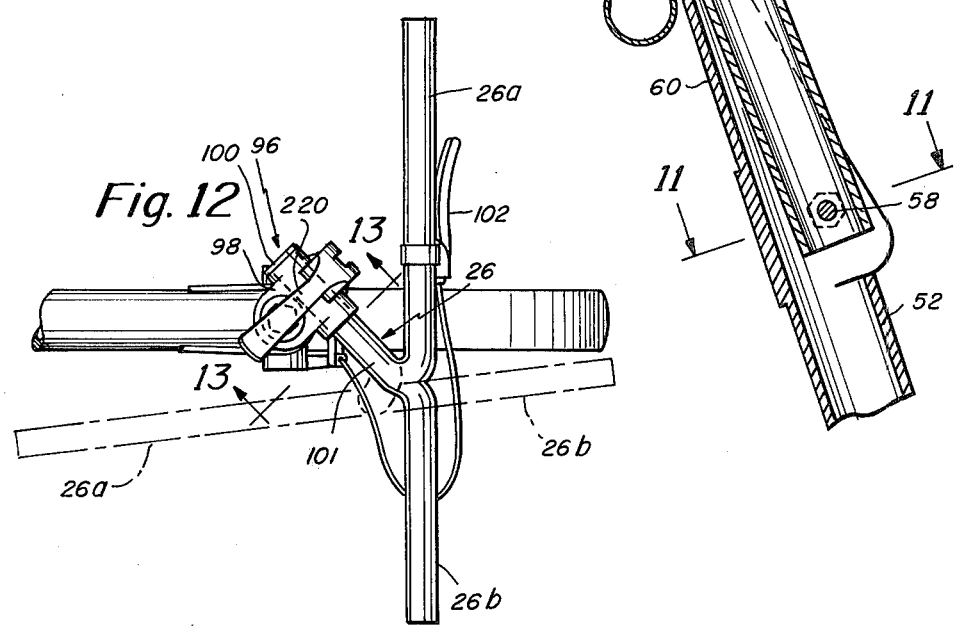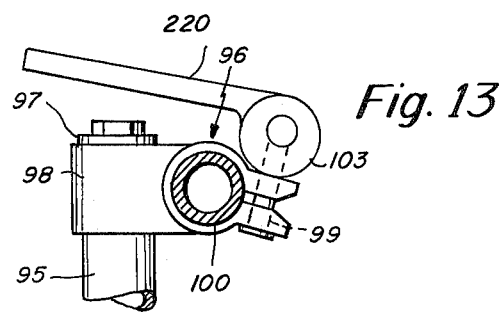

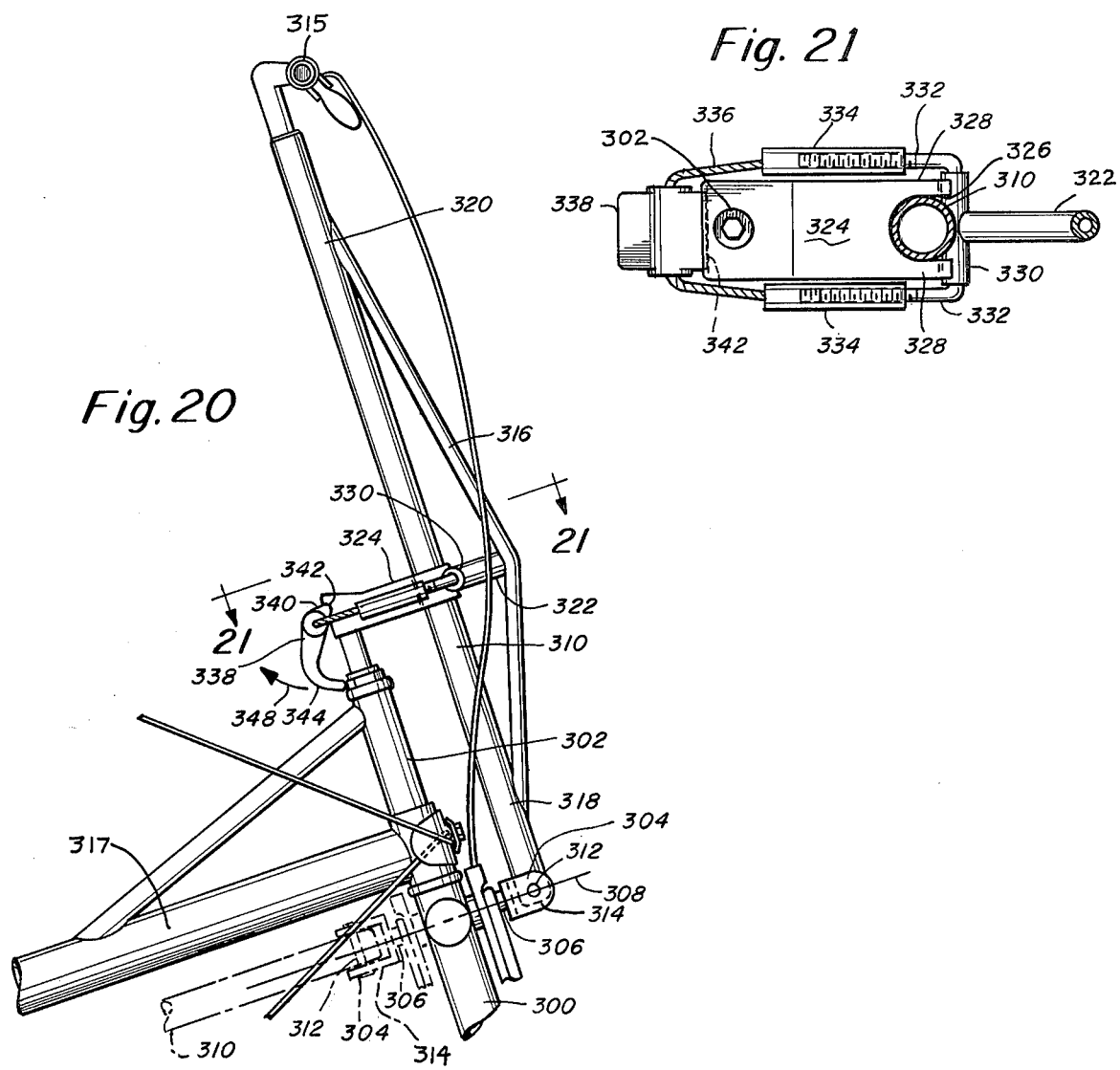
Fig. 20
Fig. 21
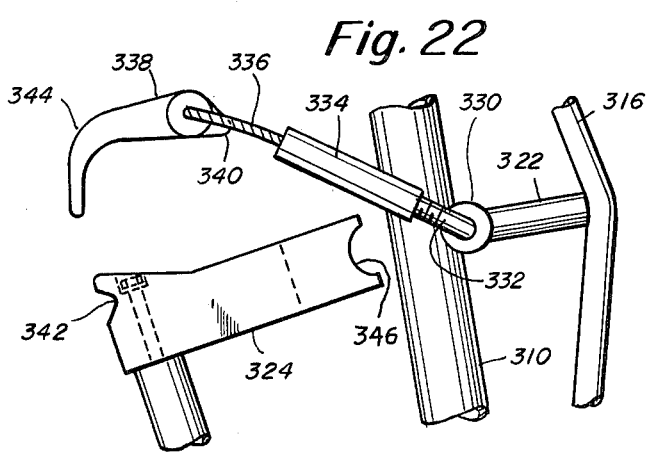
Fig. 22
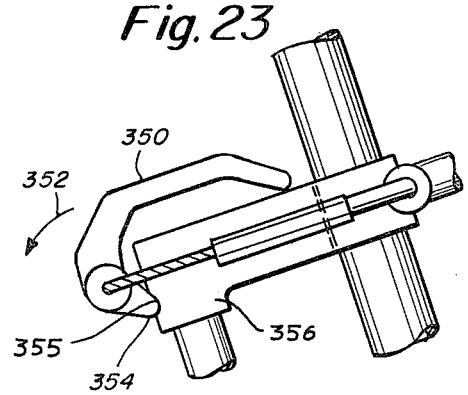
Fig. 23

COLLAPSIBLE BICYCLE

BACKGROUND AND SUMMARY OF THE INVENTION

This application is a continuation-in-part of my earlier copending application filed Aug. 11, 1977, Ser. No. 823,708, entitled Collapsible Bicycle and now abandoned.

This invention relates to wheeled vehicles and more particularly comprises a foldable bicycle which is stiffened when erect by cables.

Folding bicycles are not new; many are found in the prior patent literature. Examples of the many prior United States patents disclosing folding bicycles are U.S. Pat. Nos. 1,584,314, 1,626,775, 1,863,859, 3,419,283 and 3,623,749. Typically the bicycles shown in those patents exhibit a general deficiency in stiffness as a result of the necessity to compromise the structural integrity of the frame in order to make them foldable in the first place.

A very recently issued U.S. Pat. No. 3,990,717 shows a highly sophisticated and complex collapsible bicycle. While it theoretically may possess the necessary structural stiffness, that can only be achieved in practice when the parts are made of costly materials and with extreme accuracy, and with the attendant high cost. Moreover, the assembly is very complicated to fold and unfold, which would discourage its use.

A principal and distinguishing feature of the bicycle of the present invention is that the specific means employed to effect a greater than typical order of size reduction and simplification of operation and manufacture is the very same means which provides an order of stiffness to be found only in rigid frame bikes of top quality. In other words what ought to have been a compromise, the melding of rigidity and plasticity in the same device, has been achieved without compromise. What is new and unique in the bicycle of this invention simultaneously provides a degree of flexibility, rigidity and plasticity in the geometrical and operational sense previously unavailable in folding bicycles.

Another important feature of this invention not found in the prior art is the ability to vary the fundamental geometry of the bicycle frame itself. Heretofor adjustments have only been possible in the seat and handlebar height and angle. In the preferred form of the present invention, in addition to those conventional adjustments, the pedal sprocket height and the angular position of the seat tube can also be adjusted to accommodate a particular user.

In accordance with the present invention the bicycle frame includes a rigidly interconnected head tube and down tube and a bottom bracket assembly rigidly mounted on the rear end of the down tube. The head tube carries a generally conventional front wheel fork, and in one embodiment of this invention a handlebar stem is connected to the fork above the head tube. A chain stay is pivotally mounted on and extends generally rearwardly from the bottom bracket assembly. A seat tube is also pivotally mounted on the bottom bracket assembly. In addition, a cable strut is pivotally connected to the bottom bracket assembly and extends downwardly substantially in axial alignment with the seat tube. The chain stay and seat tube are held in their erect (operative) positions by a pair of folded cables, one extending from the head tube upwardly and rearwardly to the seat tube and then downwardly and rearwardly to dropout plates at the rear of the chain stay, and the other cable extending from the head tube downwardly and rearwardly to the strut and then upwardly and rearwardly to the dropout plates. The axis of the pivotal connection between the seat tube and bottom sprocket assembly and between the chain stay and bottom sprocket assembly are such that the seat tube and chain stay may be pivoted when the bicycle is folded so as to lie closely adjacent to the down tube without interference from other components of the bicycle.

In the preferred embodiment of this invention the seat tube is constructed as a two part folding toggle-like device. The seat tube in its folded configuration is first connected to its cable support and it thereafter is straightened, and as it is straightened, the toggle pivot passes over center so as to rigidify the frame.

The stem of the handlebars in the preferred embodiment is also foldable, and when collapsed the stem lies parallel and closely adjacent to the down tube, and the handle grips lie in a plane closely adjacent and substantially parallel to the plane established by the head and down tubes. The angular position of the seat tube may be adjusted for the particular rider by varying the position of the coupling between the cable and the seat tube. The height of the sprocket may be varied by adjusting the length of the cable which interconnects the head tube and dropout plates via the strut.

This invention will be better understood and appreciated from the following detailed description read in connection with the accompanying drawings.

BRIEF FIGURE DESCRIPTION

FIG. 9 is a front fragmentary view of the head tube of the bicycle showing the manner in which the cables are connected to it;

FIG. 10 is an enlarged fragmentary cross-sectional view of the seat tube and including the coupling between the cable and the tube;

FIG. 11 is a cross-sectional view taken along the section line 11—11 of FIG. 10;

FIG. 12 is a top plan view of the handlebars and stem looking in the direction of sight line 12—12 of FIG. 1 and suggesting in broken lines the collapsed position of the handlebars;

FIG. 13 is a fragmentary cross-sectional view taken along section line 13—13 of FIG. 12;

FIG. 20 is a view of the handlebars, head tube, down tube and fork assembly constructed in accordance with the preferred embodiment of the invention;

FIG. 21 is a cross-sectional view taken along the section line 21—21 of FIG. 20;

FIG. 22 is a detail view of the assembly of FIG. 20 showing the toggle latch open; and FIG. 23 is a detail view of another embodiment of toggle latch for the assembly of FIG. 20.

DETAILED DESCRIPTION

Figure 1:
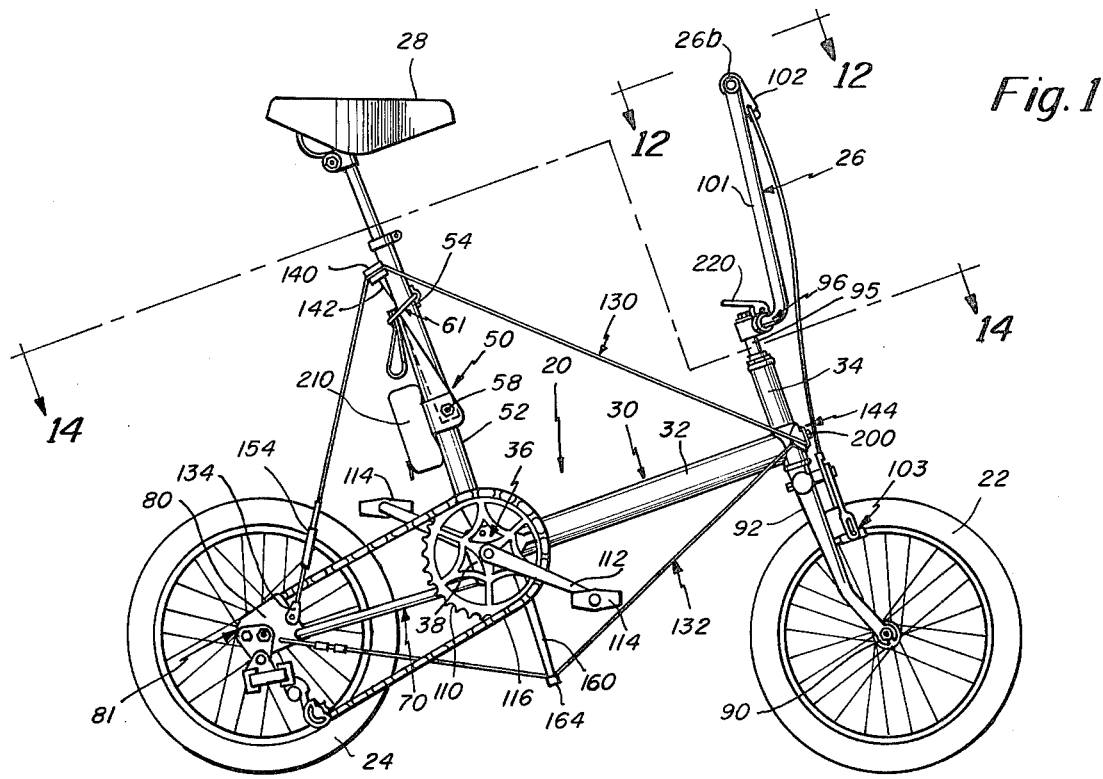
FIG. 1 is a side elevation view of a collapsible bicycle constructed in accordance with this invention.

The bicycle shown fully erected in FIG. 1 includes a frame 20, front and rear wheels 22 and 24, handlebars 26 and seat 28 in the general fashion of all bicycles. The frame assembly, however, is collapsible and incorporates many features which are markedly different from the prior art.

Figure 7:
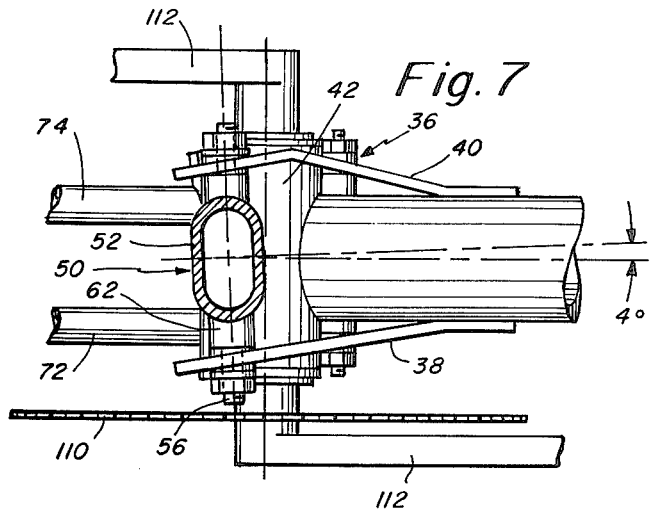
FIG. 7 is a fragmentary cross-sectional view taken along the section line 7—7 of FIG. 6.
Figure 8:
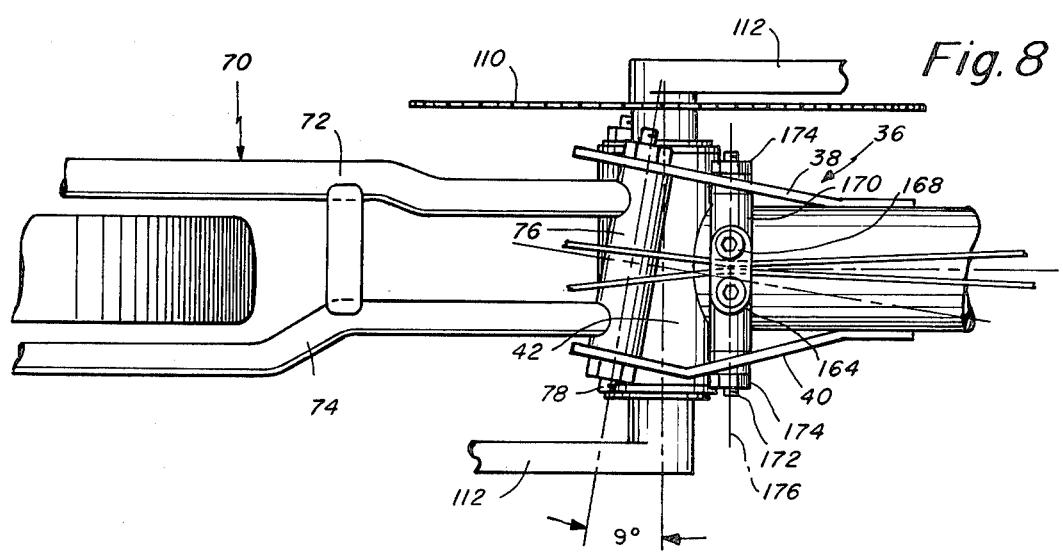
FIG. 8 is a fragmentary bottom view of the bottom bracket looking in the direction of sight line 8—8 in FIG. 6.

Frame 20 includes a main frame member 30 having a down tube 32 and head tube 34. The down and head tubes preferably are lugged at their junction, but they may be secured together by any other conventional means. In the embodiment shown, there is no articulation provided in the frame between the down and head tubes. A bottom bracket assembly 36 is rigidly secured to the lower end of the down tube 32. The bottom bracket assembly includes a pair of plates 38 and 40 and a bracket sleeve 42 (see FIGS. 7 and 8) in which are assembled the bearings, axle, etc. (not shown) that form part of the front sprocket assembly. The axis of the bottom bracket sleeve 42 is perpendicular to the axis of down tube 32 and the central vertical plane of the bicycle.

Figure 3:
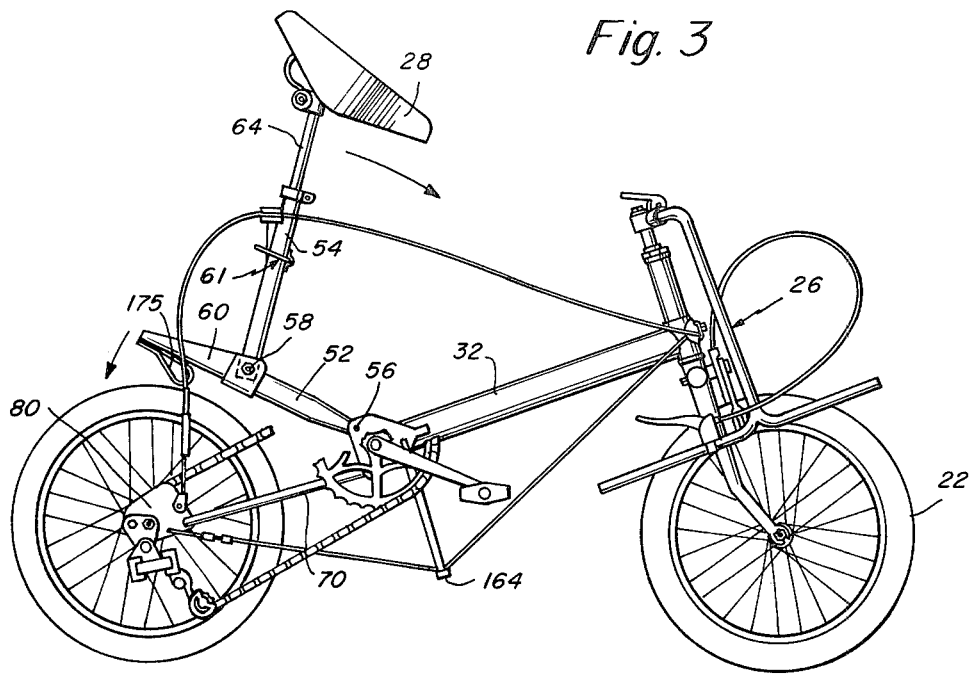
FIGS. 3 and 4 are side views of the bicycle showing the manner in which the seat tube is folded to collapse the bicycle.
Figure 4:
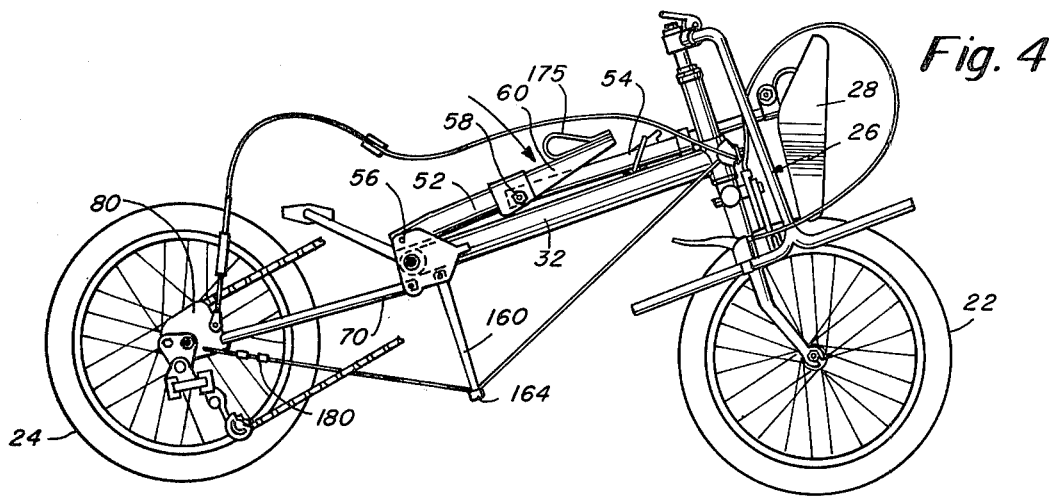

Seat tube 50 that forms part of the frame is composed of two pivotally interconnected sections 52 and 54 which in turn are supported for pivotal movement on the bottom bracket assembly 36. The lower section 52 of the seat tube 50 is pivotally connected to the bottom bracket by a pin 56 that enables the lower tube section 52 to pivot both back and forth from the erect position of FIG. 1, as illustrated in FIGS. 3 and 4. The upper seat tube section 54 is pivotally connected to the lower section 52 by a pin 58, and the half sleeve extension 60 of the lower seat tube section restricts pivotal motion of the upper seat tube section 54 to a forward (clockwise) direction with respect to the lower seat tube. The seat tube may be collapsed by "breaking" the tube in a rearward direction with respect to the bottom bracket assembly as shown in FIG. 3 and then again aligning the upper and lower sections of the seat tube so that they lie approximately parallel to down tube 32. The pin 56 which connects the bottom section of the seat tube 52 to bottom bracket assembly 36 extends through a sleeve 62 between the plates 38 and 40 of the bottom bracket, and the tube 62 and therefore the pin 56 in it are displaced a few degrees from the perpendicular to the down tube 32 so as to allow the seat tube 50 along with the seat post 64 and seat 28 to assume the collapsed position without interference with the head tube and handlebars. As is evident in FIG. 10 the seat post 64 is adjustably anchored in the upper section 54 of the seat tube by means of a binder bolt 68 of generally conventional design. The specific angular relationships between seat tube 50 and down tube 32 as well as the angular relationship between the other parts of the frame are described in greater detail below.

When the upper and lower sections of the seat tube are aligned, safety lock 61 may be used to prevent accidental collapse of the seat tube. The lock 61 includes a ring 63 pivoted on the upper tube 54 by means of bracket 65. The ring may be positioned either in locking position shown in full lines over the extension 60 of lower section 52 or the unlocked position shown in broken lines free of extension 60.

Figure 14:
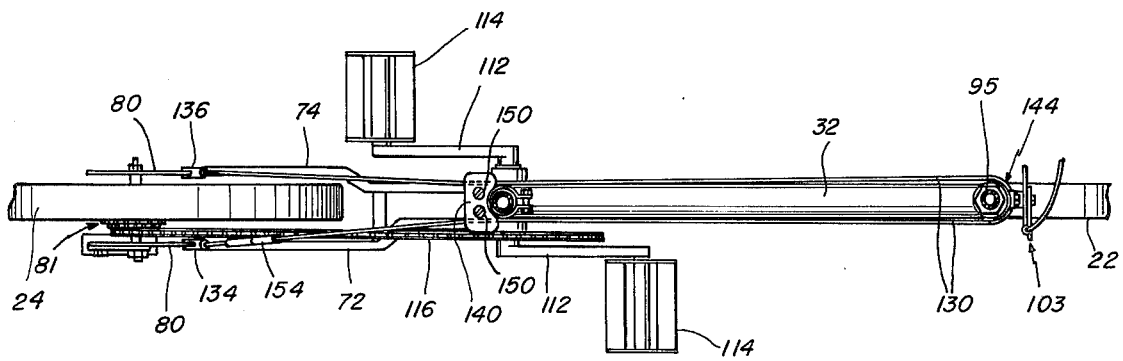
FIG. 14 is a top plan view of the bicycle viewed from the plane of sight line 14—14 of FIG. 1.

Frame 20 also includes a pivotally mounted chain stay assembly 70 composed of a pair of rearwardly extending arms 72 and 74 rigidly connected to a sleeve 76 at their forward ends (see FIG. 8), which in turn is connected by a pin 78 to the bottom bracket assembly 36. The rear ends of the arms 72 and 74 carry dropout plates 80 that support the rear wheel 24 with its rear sprocket assembly 81, as shown in FIGS. 1 and 14. The axis of pin 78 (and sleeve 76 that supports the chain stay assembly) is displaced approximately 9° from the axis of bottom bracket sleeve 42 which supports the front sprocket assembly. This angular relationship of the two axes enables the bicycle to collapse in the compact bundle shown in FIG. 5 as is described more fully below.

Front wheel 22 is carried in the dropouts 90 of fork 92 which in turn is supported in head tube 34 by a head set, the details of which form no part of the present invention. The fork is connected to the handlebar stem 95 which is articulated at 96 as shown in detail in FIGS. 12 and 13. The stem 95 carries an elbow 98 which extends horizontally from the stem top 97 at an angle of 45° from the central vertical plane of the bicycle, and the end of the elbow pivotally supports the lower horizontal extension 100 of the handlebars 26 in the clamp 99 operated by the cam handle 220. The 45° displacements of the elbow and the extension 100 of the handlebars enable the handlebars to swing in a pivotal motion as suggested in FIG. 2 from the erect position wherein the handlebars 26 are disposed precisely perpendicular to the central vertical plane of the bicycle and parallel to the axis of the front wheel 22 as established by the dropouts 90, to a collapsed position wherein the handlebars are folded downwardly so as to lie immediately adjacent to and substantially parallel to the head tube 34 with the line of the grips 26a and 26b disposed in a plane substantially parallel to the front wheel 22. The bicycle in the embodiment shown carries a single brake hand lever 102 that operates the front brake assembly 103 supported on the fork 92 in conventional fashion. Obviously a second brake could be included.

Figure 19:
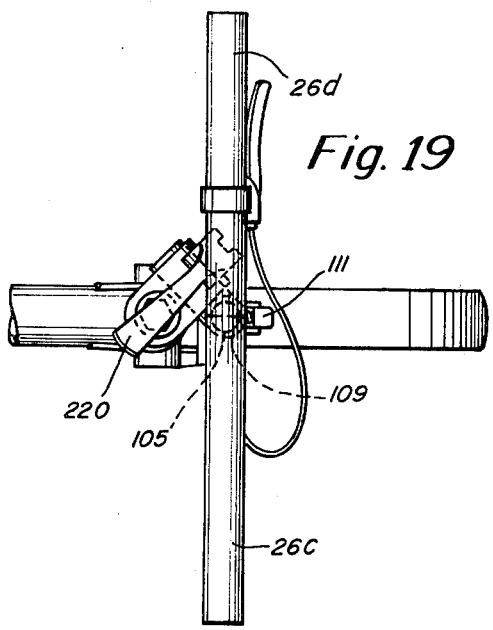
FIGS. 18 and 19 are fragmentary views of a modified handlebar assembly made in accordance with this invention.
Figure 18:
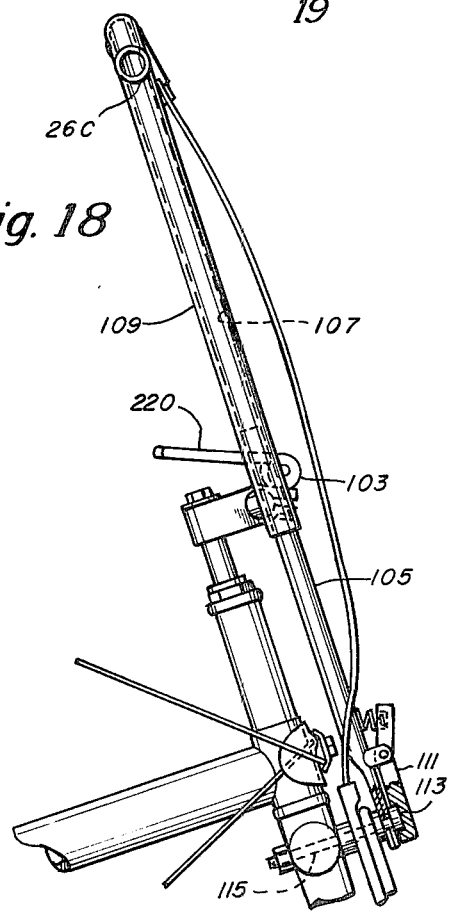

In FIGS. 18 and 19 a modified handlebar assembly is shown. While in the first described embodiment the post 101 of handlebar 26 is displaced from the central vertical plane of the bicycle, in the embodiment of FIGS. 18 and 19 it is not, so that grips 26c and 26d are substantially the same length.

A more significant change in this embodiment resides in the handlebar post construction and safety lock. In the first embodiment, the handlebar is maintained erect by cam 103 of the cam handle 220, which pinches the clamp 99 of elbow 98 closed. In this embodiment a safety lock is added to the handlebar assembly in the form of a tubular extension 105 that telescopes into the cavity 107 in handlebar post 109. When the handlebar is erect, the extension 105 is lowered so that its lower end which carries spring loaded catch 111 engages the head 113 of the bolt 115 in front brake assembly 117. In the position shown in FIG. 18, the extension locks the handlebar in place, and should the cam handle 220 turn so as to relieve the pressure on the clamp 99, the handlebar will nevertheless remain erect. To collapse the handlebar, the catch 111 is pressed to disengage the brake bolt head 113 and the extension 105 is telescoped into the cavity 107 in post 109. The cam handle is then loosened and the post 109 can pivot to the collapsed position just as in FIG. 2.

The front sprocket 110 carries conventional cranks and pedals 112 and 114, and the drive chain 116 extends from the front sprocket to the rear sprocket assembly 81. In the embodiment shown, a derailleur is employed for changing the chain position on the various rear sprockets of the rear sprocket assembly 81 on the axle of the rear wheel 24. The rear sprockets and derailleur may be of conventional design and their details form no part of the present invention.

The erected frame is held rigid by top and bottom cable assemblies 130 and 132, respectively. The top cable assembly 130 extends along each side of the frame from the rear wheel dropout plates 80 and engages the upper section 54 of the seat tube 50 and the head tube 34. The ends 134 and 136 of cable 138 of the cable assembly 130 are pivotally pinned to the dropout plates 80 on each side of the cable is adjustably secured to a cable block 140 which in turn is releasably attached to a post 142 formed as an integral part of the upper seat tube section 54, and the forward bite of the cable 138 is looped about the head tube 34 and retained in place by the cable retainer assembly 144.

The cable block 140 is composed of upper and lower sections 146 and 148 secured together by means of a pair of screws 150 that clamp the cable between the two sections. The lower section 148 of the block has a recess 152 which receives the post 142 so as to firmly hold the block on the seat tube when the bicycle is erected. The cable assembly 130 also includes a turnbuckle 154 adjacent one end that enables the assembly to be adjusted and to assure proper tension on the cable when the bicycle is erect.

As is evident in FIGS. 1 and 10, when the bicycle is erect, the lower member 148 of block 140 is mounted on post 142, and seat tube 50 is elevated and straightened. The position of pin 58 joining the upper and lower seat tube sections, the position of block 140 on cable 138, and the position of pin 56 which supports the lower end of the bottom seat tube section 52 on the bottom bracket assembly are such that the seat tube acts as an over center toggle when erected so that the several parts controlled by the cable are held in fixed relationship to one another. The locking ring assembly 61 further assures against collapse of the seat tube.

Figure 5:
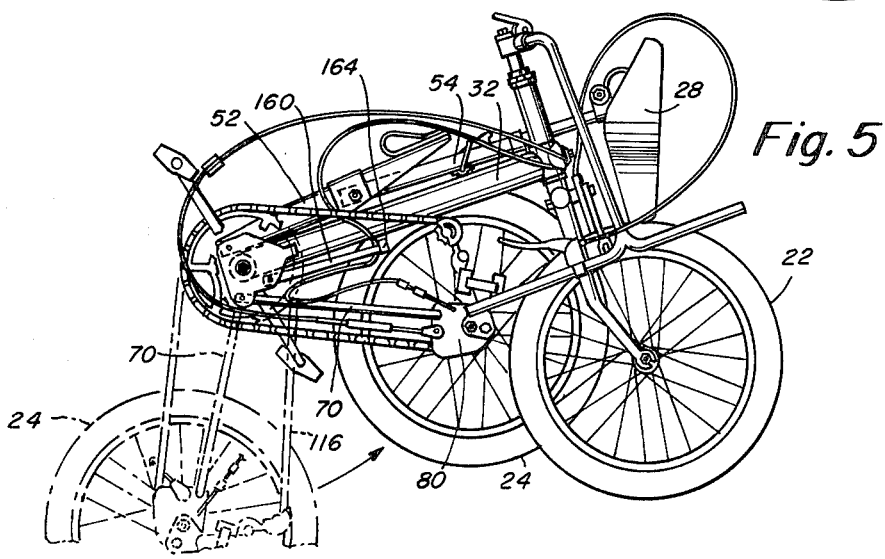
FIG. 5 is a side view of the bicycle showing the manner in which the chain stay carrying the rear wheel is collapsed and suggesting in broken lines an intermediate position of the stay and rear wheel.
Figure 6:
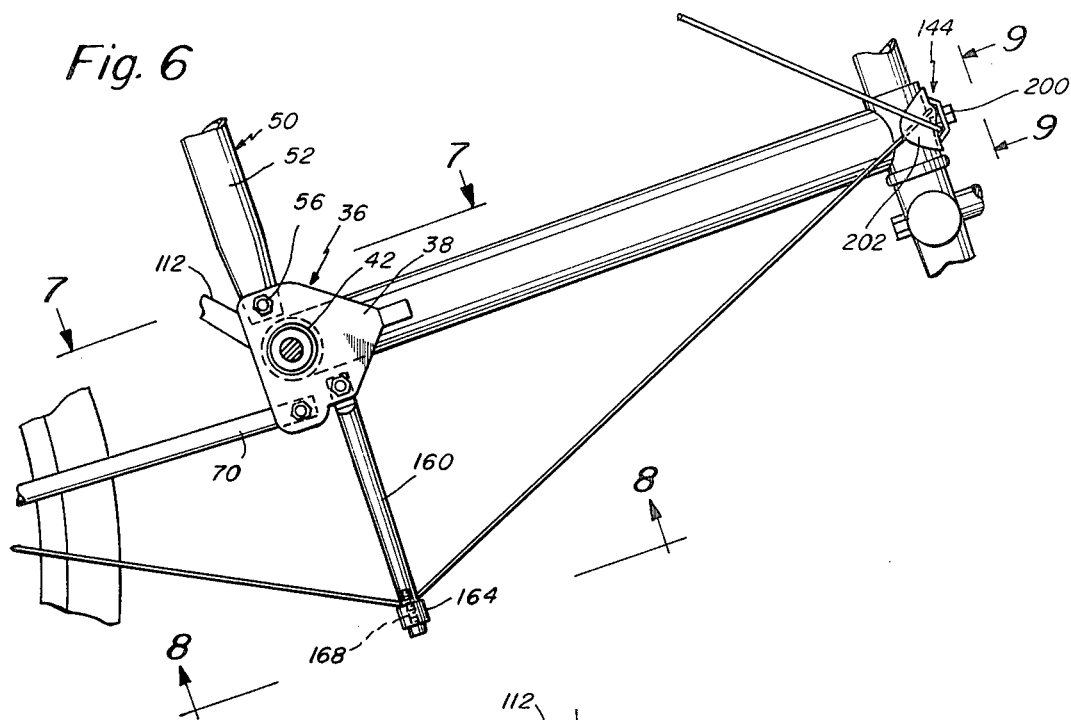
FIG. 6 is an enlarged fragmentary side view showing the details of the bottom bracket and the manner in which different parts of the frame are connected thereto.

The lower cable assembly 132 extends along each side of the frame from the rear wheel dropout plates 80 over a pivotally supported strut 160 to the cable retainer assembly 144 on head tube 34. In detail, cable assembly 132 includes a cable 162 which is folded upon itself like cable 138, and its free ends are anchored to the two dropout plates 80. A lower cable block 164 is carried on the cable 162 as shown in FIGS. 1 and 6, and the cable block is removably mounted on the lower end of strut 160 by means of fasteners 168. Strut 160 is pivotally supported on the bottom bracket assembly plates 38 and 40 by means of its sleeve 170 which is carried on threaded axle 172 and secured in place by nuts 174. The axis 176 of the axle 172 is perpendicular to the central vertical plane of the bicycle and parallel to the axis of sleeve 42. Consequently, when the strut is collapsed as shown in FIG. 5 its center line is substantially parallel to the center of down tube 32 of the frame. The lower cable assembly also includes a turnbuckle 180 adjacent one end for adjusting the length of the lower cable. This is explained in greater detail below.

Figure 2:
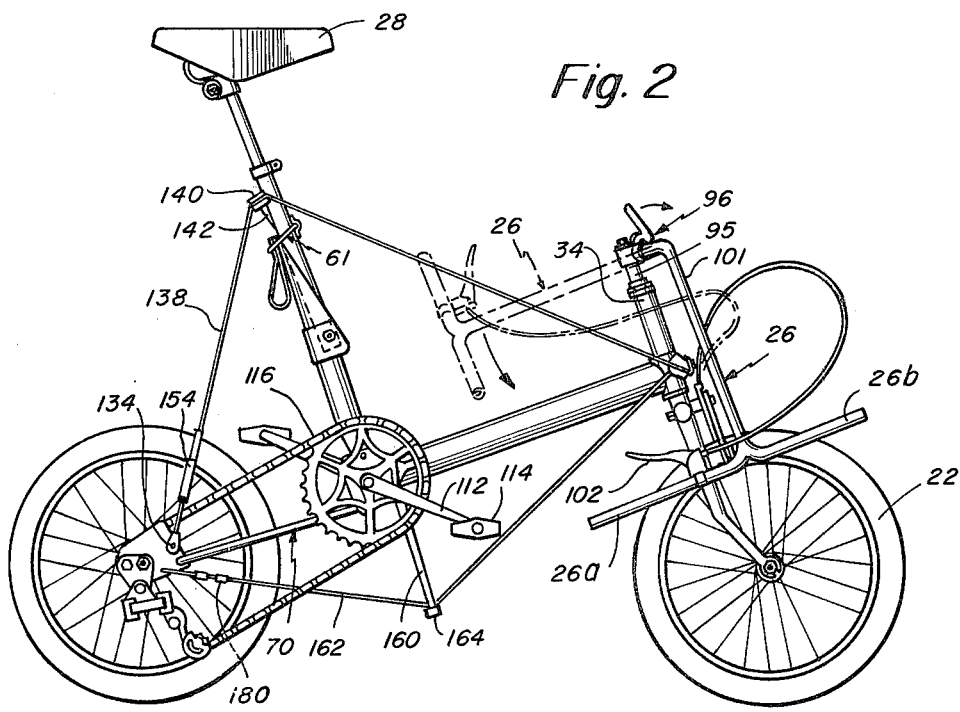
FIG. 2 is a side view of the bicycle shown in FIG. 1 with the stem of the handlebars in the collapsed or folded position.

FIGS. 1-5 illustrate the manner in which the erected bicycle may be collapsed, and the sequence of steps illustrated in those drawings is described in detail below. In FIG. 2 the handlebar stem post 101 is shown being folded from the erect or straight line position of FIG. 1 to the fully collapsed position wherein the upper section of the stem lies substantially parallel to the head tube 34 with the handlebar grips 26a and 26b disposed at right angles to their normal position and lying closely parallel to the plane of front wheel 22. If the handlebars are of the form shown in FIGS. 18 and 19, they are obviously folded down in similar fashion. Next, as shown in FIGS. 3 and 4 the seat tube is collapsed by opening safety lock 61 and pulling the hand strap 175 rearwardly. The hand strap 175 is provided for that purpose on the top of the bottom section 52 of the seat tube 50. By collapsing the seat tube in that manner, tension is relieved from the upper cable assembly 130 so that the upper cable block 140 may be disconnected from the post 142 on the seat tube, and thereafter the seat tube may again be straightened but collapsed along the down tube 32 of the frame. Because of an angle of approximately 4° between pin 56 and a line perpendicular to the central vertical plane of the bicycle, when the seat is collapsed, the upper end of the post 64 which supports seat 28 clears the head tube 34 and lies very closely adjacent to it. It will be appreciated that in the absence of this angular displacement of pin 56, the seat tube would not be capable of collapsing as fully as is shown, and a less compact assembly would result.

The next step in collapsing the bicycle is to lift the down tube 32 so as to allow the chain stay 70 which supports the rear wheel 24 to pivot counterclockwise about the bottom bracket pin 78. Because the cable block 140 is disconnected from the seat tube assembly 50 and therefore applies no restraint upon the chain stay, the chain stay may swing under the down tube, and the strut 160 simultaneously is allowed to pivot counterclockwise on the bottom bracket so that it too lies along the bottom of down tube 32. Because of the approximately 9° angle between the axis of the pin 98 and the perpendicular to the central plane of the bicycle, as the chain stay swings counterclockwise, the rear wheel 24 is displaced from the plane of the front wheel 22 and moves to a position directly beside it. In this manner, the bicycle is fully folded as is shown in FIG. 5.

Figure 15:
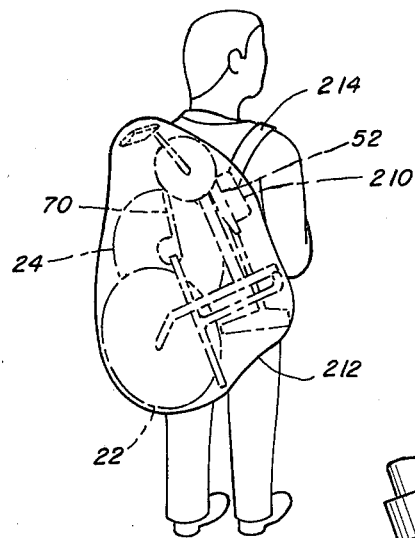
FIG. 15 is a sketch suggesting how the collapsed bicycle may be packed in a bag carried over the shoulder.

As shown in FIG. 1 (and omitted from other figures for clarity), a pouch 210 is carried on the rear side of the lower section 52 of seat tube 50, beneath strap 175, and that pouch when opened releases a large flexible cover 212 which is designed to enclose the fully folded bicycle. In FIG. 15 cover 212 is suggested enclosing the fully folded bicycle, and shoulder strap 214 provided on the cover enables the assembly to be carried conveniently on the shoulder.

To erect the bicycle from the fully folded condition, the procedure described above is reversed. Thus, first the chain stay is pivoted clockwise about the bottom bracket so as to orient the rear wheel in the proper position with respect to the front wheel. The operator must be sure that the lower cable block 164 of lower cable assembly 132 is securely fastened to the bottom strut 160. Next, the seat tube is erected by mounting the cable block 140 on the post 142 and thereafter straightening the tube so that the upper and lower sections are aligned with the pin 58 connecting them crossing over the center line between the point where the cable block 140 connects to the tube and the point where pin 56 joins the lower end of the seat tube section 52 to the bottom bracket assembly. As the last step of the assembling operation, th user unfolds the stem of the handlebars 26 and secures the stem in the erect position by means of the fastener 220. If a pouch and cover is included in the assembly, the cover 212 must of course be repacked in pouch 210.

In the embodiment shown the front cable retainer assembly 144 includes a post 200 over which the lower cable is looped and under which the upper cable is looped, as suggested in FIGS. 1 and 9. An anti-chaffing pad 202 separates the bites of the two cables as they loop about the post 200, and a clamp and fastener are employed to retain the assembly together. If desired a second pad could be placed beneath both cables to protect the head tube. While in the embodiment shown the cables cross one another on the side of the head tube immediately adjacent the post 200, it will be appreciated that that is not essential, and other types of anchors can be employed to secure the cables to the head tube.

Figure 16:
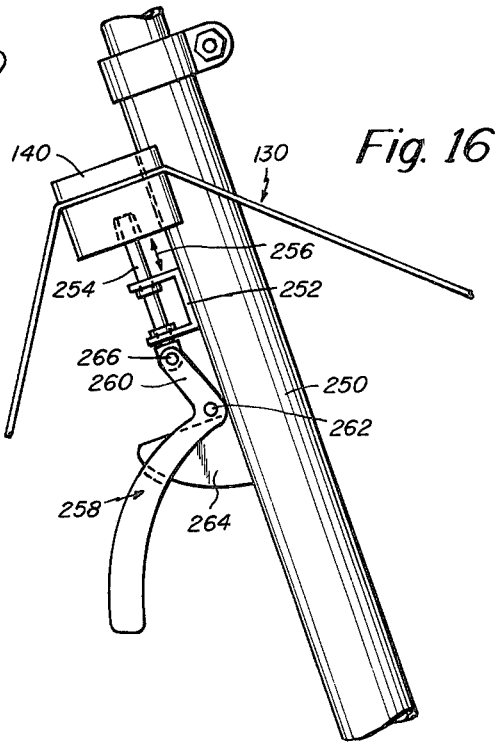
FIG. 16 is a fragmentary view of an alternative embodiment of seat tube made in accordance with this invention.

In FIG. 16, another form of seat tube is shown. In this embodiment, the seat tube is not foldable as in the first described embodiment. Rather, seat 250 is made in one piece and pivoted at its lower end (not shown) to the bottom bracket assembly 36 in the same manner as the bottom section 52 of the seat tube 50 in the embodiment of FIG. 1. Seat tube 250 carries a bracket 252 that slidably supports a block mounting peg 254 as suggested by arrow 256. Ped 254 is supported in its elevated position by the toggle lever 258 whose arm 260 is pivotally connected to the lower end of the peg. When the lever is in the position shown in FIG. 16, its pin 262 rests on flange 264 so that peg 254 cannot move downwardly from the position shown in the drawing. However, if the toggle lever 258 is pivoted clockwise from the position shown about its pivotal connection 266 with the bottom of peg 254 so as to unseat the pin 262 from the flange 264, peg 254 is then permitted to descend from the position shown in FIG. 16.

To erect the seat post 250 to the operative position, the upper cable lock 140 is mounted on the top of peg 254 in the same manner as shown in FIG. 10. This may be done either with the seat post 250 pivoted in a somewhat forwardly extending position towards the down tube or in the erect position shown in FIG. 16. With the seat post 250 in the erect position and the block 140 on peg 254, the toggle lever 258 is moved to the position shown in FIG. 16 with the pin 262 resting on flange 264. The over-center action of pin 262 with respect to the axis of peg 254 insures that the seat post will remain erect under the control of the upper cable assembly 130.

Figure 17:
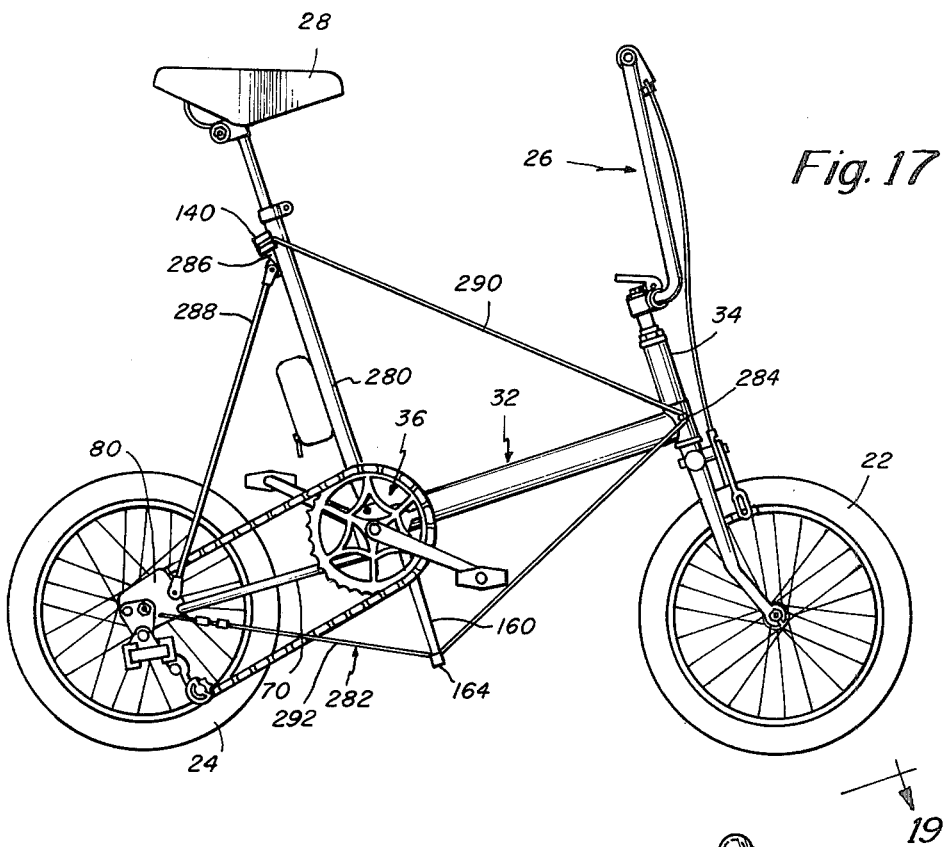
FIG. 17 is a fragmentary view of another embodiment of collapsible frame made in accordance with this invention.

In FIG. 17, a modified form of the bicycle is shown. Essentially the difference between the bicycle of FIG. 17 and that shown in FIG. 1 is in the arrangement of the cable assembly and the configuration of the seat post. These changes reduce the cost of manufacturing the bicycle.

The bicycle of FIG. 17 includes a down tube 32, head tube 34, chain stay 70, strut 160, front and rear wheels 22 and 24, seat 28 and handlebar 26, all substantially identical to those in FIG. 1. The seat tube 280 however is made of one piece much like the seat tube 250 in FIG. 16. The cable assembly however is formed from a single cable 282 which extends from the dropout plates 80 at the rear wheel and over block 164 and about anchor 284 on the head tube 34, to the block 140 connected to the pin 286 at the upper end of the seat post 280. As in the embodiment of FIG. 1, the cable is folded upon itself so that the two ends are actually connected to the dropout plates 80 on the opposite sides of the rear wheel 24 and the bite of the cable is attached to the block 140. An elasticized cord 288 separately connects the seat tube 280 to the dropout plates 80 for purposes which will become apparent below.

When the bicycle is erect as shown in FIG. 17, cable 282 acts in tension in response to a downward force applied to the frame, as for example by a rider seated on saddle 28, to maintain the angular relationships between down tube 32, chain stay 70 and head tube 34. The legs 290 of cable 282 will prevent the seat post 280 from pivoting couterclockwise as viewed in FIG. 17 with respect to the down tube 32. In a similar fashion, the legs 292 of cable 282 will prevent the chain stay 70 from pivoting clockwise with respect to the bottom bracket assembly 36. To collapse the bicycle the operator need only fold the handlebar 26 in the same fashion as described above, remove cord 288 so as to permit the seat post 280 to pivot clockwise so as to assume a position substantially identical to that of the seat tube in FIG. 4, and thereafter lift the bottom bracket assembly 36 to allow the chain stay 70 and strut 160 to pivot to the position suggested for the first embodiment in FIG. 5. Cord 288 merely serves generally to maintain the orientation of the various parts of the frame in the position shown in FIG. 17 when the bicycle is erect but free of any substantial vertically applied load such as is impressed upon the frame by a rider.

In FIGS. 20–22, the preferred form of handlebar assembly is shown. It is an improvement over the assembly shown in FIGS. 18 and 19 for it provides added strength and rigidity. In FIG. 20, the front fork 300 is shown carried by the head tube 302, and a bracket 304 is bolted to the top of the fork just below the head tube by bolt 306. The bolt 306 which as shown supports the front wheel brake assembly also allows the bracket 304 to rotate about axis 308.

The handlebar post 310 is pivotally connected by means of pin 312 to the ears 314 of bracket 304 so that the handlebar post 310 may be pivoted about the axis of pin 312. And because the bracket 304 is rotatable about axis 318, the handlebar post 310 can also be turned through 90° so that the grips 315 are aligned vertically, generally paralleled to the head tube 302. Therefore, in the absence of other restraining means, the handlebar post 310 may first be pivoted forward about horizontal pin 312, then be rotated about axis 308 to turn the handle grips vertically, and thereafter the fork 300 can be rotated to reverse the direction of the front wheel and swing the handlebar to a position along the down tube, 317, as shown in FIG. 20 in broken lines.

Stiffness is provided for the handlebar post by the trussed front strut 316 secured to the post 310 at its ends 318 and 320, and the assembly is braced by member 322. It will be recognized that any forwardly directed bending force applied to post 310 when in the erect position of FIG. 20 will be resisted by the trussed structure described.

The upper end of head tube 302 carries a rigid yoke 324 which lies substantially in a horizontal plane when the bicycle is erect. The yoke 324 has a forwardly open slot 326 defined by its arms 328, and the width of slot 326 just exceeds the diameter of the handlebar post 310 so that the post may slide in and out of the slot when it is pivoted about the pin 312 with the pin axis oriented in a horizontal plane.

Post 310 at brace member 322 carries a cross tube 330 which may be welded, braised or otherwise secured in place with its axis perpendicular to the axis of the post. Elbows 332 are pivoted in cross tube 330, and the ends of elbows 332 carry turnbuckles 334 that in turn carry a cable 336. The cable in turn carries a toggle handle 338. Handle 338 has a tongue 340 shaped to register with a groove 342 formed in the rear surface of yoke 324 and the handle also has a grip 344.

It is evident that the handlebar assembly may be locked in the erect position of FIG. 20 by sliding the post 310 into the slot 326, placing the tongue 340 of the toggle in the groove 342, and then swinging the handle down to the locked position of FIG. 20. When the handlebar assembly is locked as shown, the cross tube 330 bears against and sits in the recesses 346 formed in the forward ends of the arms 328 of the yoke. Thus, the yoke and cross tube bear the compressive forces applied by the toggle, and the hollow tubular post 310 is not subjected to those forces. The unlock the handlebar assembly so as to be able to collapse the bicycle, the grip 344 is pivoted in the direction of arrow 348 to unseat the tongue 340 from the groove 326, and the cable asembly is lifted over the yoke as shown in FIG. 22 so as to free the post 310 and permit it to be pivoted in a forward direction.

It will be appreciated that while the toggle 338 of FIGS. 20-22 is designed to be moved between a downlocked position and a raised-unlocked position (see particularly FIGS. 20 and 22), the action may be reversed. For example, as shown in FIG. 23, the grip 350 of the toggle is pivoted so that in the raised-forward position it serves to lock the handlebar assembly in place, and the assembly is opened when the grip is swung through approximately 270° in the direction of arrow 352 so as to release the tongue 354 from its groove 355 and thereby allow the toggle on the cable to be lifted over the end of the yoke 356.

It will be appreciated that with this arrangement, very substantial rigidity is afforded the handlebar assembly, and there is no opportunity for accidental collapse. The handlebar itself by virtue of the front strut construction is more rigid than in the other embodiments and will therefore sustain any forces which ordinarily may be applied to it.

Having described this invention in detail it will be appreciated that its many advantages set forth in the introduction are in fact attained. For example, in the preferred embodiment shown in FIG. 1, the angle of the seat post 50 may be adjusted so as to accommodate the particular user by varying the position of block 140 on cable 130. Similarly, the height of the axis of the front sprocket 110 may be adjusted by means of the turnbuckle on the lower cable 132. By shortening the length of cable 132, the axis of sprocket 110 will be raised.

The cable assemblies not only provide rigidity to the frame by means of the triangulation as viewed in elevation, but provide stiffness to the frame as well by virtue of the triangulation formed by the two sides of the cable particularly between the seat post and the dropout plates 80 as viewed in FIG. 14. It will be noted in that figure that the two sides of upper cable assembly 130 diverge from the block 140 in a rearward direction to form a triangular configuration which resists any swaying of the chain stay 70 out of the vertical center plate of the bicycle.

It will also be appreciated that while the application describes a cable, any tensil means may be employed to form the tension member about the perimeter of frame and apply compression to the frame components which radiate from the bottom sprocket assembly. For example, a chain composed of a series of links could be used in place of a cable, and the word cable as used herein is deemed to be generic to such devices.

It will also be appreciated that while the invention is described as incorporated into a bicycle, many of the teachings of this invention may find utility in a tricycle or in a motor driven vehicle such as a moped.

Because numerous modifications may be made of this invention without departing from its spirit, it is not intended that the breadth of this invention be limited to the specific embodiments illustrated and described. Rather, it is intended that the scope of this invention be determined by the appended claims and their equivalents.

What is claimed is:

1. A wheeled vehicle comprising
   a head tube and a down tube connected together,
   a bottom bracket assembly connected to the rear end of the down tube,
   a seat tube having its lower end pivotally mounted on the bottom bracket assembly,
   a chain stay having its forward end also pivotally mounted on the bottom bracket assembly,
   and means including a cable assembly and having cable means on each side of the vehicle interconnecting the head tube with the seat tube and with the chain stay.

2. A wheeled vehicle as defined in claim 1 further characterized by
   said cable assembly further interconnecting the seat tube and the chain stay.

3. A wheeled vehicle as defined in claim 1 further characterized by
   a strut extending downwardly from and pivoted to the bottom bracket assembly,
   said cable assembly interconnecting the strut with the head tube and chain stay.

4. A wheeled vehicle as defined in claim 3 further characterized by
   means for varying the effective length of the cable between the head tube and chain stay,
   and means for varying the effective length of the cable between the head tube and strut whereby the height of the bottom bracket may be adjusted to suit the rider.

5. A wheeled vehicle as defined in claim 1 further characterized by means for varying the effective length of the cable means between the head tube and the seat tube whereby the distance between the seat and a vertical line through the bottom bracket assembly may be adjusted to suit the rider.

6. A vehicle as defined in claim 3 further characterized by said seat tube including upper and lower sections which are in substantial alignment when the vehicle is erected, a pivotal connection joining the upper and lower sections of the seat tube and the bottom bracket assembly and a connection between the cable means and the seat tube, said pivotal connection between the upper and lower sections of the seat passing over center with respect to the connection between the cable means and seat tube and between the lower section and the bottom bracket assembly when the vehicle is erected acting as a toggle to releasably retain the vehicle erect.

7. A wheeled vehicle as defined in claim 1 further characterized by a fork carrying a front wheel carried on the head tube, a rear wheel mounted on the chain stay, the axis of the pivotal connection between the chain stay and bottom bracket assembly being non-perpendicular to the central vertical plane of the vehicle permitting the rear wheel to lie in a plane beside the plane of the front wheel when the chain stay is pivoted on the bottom bracket assembly to a collapsed position.

8. A vehicle as defined in claim 6 further characterized by a fork carrying a front wheel carried on the head tube, a rear wheel mounted on the chain stay, the axis of the pivotal connection between the chain stay and bottom bracket assembly being non-perpendicular to the central vertical plane of the vehicle permitting the rear wheel to lie in a plane beside the plane of the front wheel when the chain stay is pivoted on the bottom bracket assembly to a collapsed position.

9. A vehicle as defined in claim 7 further characterized by a stem carrying a handlebar secured to the fork, and means forming part of the stem enabling the stem and handlebar to be folded downwardly to lie closely adjacent the fork and front wheel when the vehicle is collapsed.

10. A vehicle as defined in claim 6 further characterized by said cable assembly and cable means including a first cable section secured at one end to the end of the chain stay away from the bottom bracket assembly and at the other end to the head tube, said first cable section being connected intermediate its ends to the lower end of the strut, and means for adjusting the length of the first cable section.

11. A vehicle as defined in claim 10 further characterized by said cable assembly and cable means including a second cable section secured at one end to the end of the chain stay away from the bottom bracket assembly and at the other end to the head tube, said second cable section being connected intermediate its ends to the seat tube, and means for adjusting the length of the second cable section between the seat tube and the head tube.

12. A vehicle as defined in claim 1 further characterized by a seat mounted on the top of the seat tube, the axis of the pivotal connection between the seat tube and bottom bracket assembly being non-perpendicular to the central vertical plane of the vehicle whereby the seat lies beside the head tube when the vehicle is collapsed.

13. A collapsible wheeled vehicle comprising, a bottom bracket, a head tube interconnected with the bottom bracket, a fork carrying a front wheel and mounted on the head tube, a seat tube pivotally mounted on the bottom bracket and pivotable from an erect first position wherein the center lines of the head tube, fork and seat tube are coplanar in a first plane to a collapsed position wherein the seat tube extends toward the head tube at an angle to the first plane, a chain stay pivotally mounted on the bottom bracket and carrying a rear wheel, said chain stay being pivotable from a first erect position wherein the rear wheel lies rearwardly of the bottom bracket and in said first plane to a collapsed position wherein the wheel lies forward of the bottom bracket and is displaced from the first plane to a second plane beside the front wheel, and cable means for releasably retaining the seat tube and chain stay in an erect position.

14. A vehicle as defined in claim 13 further characterized by said cable means including a cable interconnecting the head tube and seat tube, and toggle means incorporated into the seat tube for holding the seat tube in the erect position.

15. A vehicle as defined in claim 13 further characterized by said cable means including a cable interconnecting the chain stay and the head tube, and a strut mounted on the bottom bracket and engaging the cable between the stay and head tube.

16. A vehicle as defined in claim 15 further characterized by said strut being pivotably mounted on the bottom bracket and being movable from a first position wherein it extends downwardly from the bottom bracket to a second position wherein it extends from the bracket toward the head tube.

17. A collapsible wheeled vehicle comprising a frame having a head tube and bottom bracket interconnected by a down tube, a seat tube and a chain stay pivotally mounted on the bottom bracket, and a strut pivotally mounted on the bottom bracket, a first cable connected between the head tube and chain stay and joining the seat tube intermediate the ends of the first cable, and a second cable connected between the head tube and chain stay and joined to the strut intermediate the ends of the second cable, each of said cables comprising a pair of coextensive halves disposed on opposite sides of the frame.

18. A collapsible wheeled vehicle as defined in claim 17 further characterized by the connection between the seat tube and first cable including a toggle means for retaining the seat tube in an erect position when the toggle means is closed.

19. A collapsible wheeled vehicle as defined in claim 18 further characterized by said toggle means including a pivoted joint in the seat tube.

20. A collapsible wheeled vehicle as defined in claim 19 further characterized by said toggle means including a pivotally mounted lever and sliding peg for releasably anchoring the first cable to the seat tube.

21. A collapsible wheeled vehicle as defined in claim 17 further characterized by a fork having a stem mounted in the head tube for carrying a front wheel, a handle bar post secured to the upper end of the fork, means secured to the stem for engaging the handle bar post above the fork, and means for releasing the post from one of the fork and stem for collapsing the handle bar post against the frame.

22. A collapsible wheeled vehicle as defined in claim 21 further characterized by said post being pivotally connected to the top of the fork, and said means securing the post to the stem including a toggle for releasably anchoring the post in an erect position to the stem.

23. A collapsible wheeled vehicle as defined in claim 21 further characterized by a bracket mounted on the fork and pivotable about a substantially horizontal axis in the plane of the frame, a pin pivotally securing the post to the bracket enabling the post to swing from a substantially vertical position wherein the post may be secured to the stem to a horizontal position, and means for turning the fork in the head tube so that the post when horizontal may extend rearwardly closely adjacent and substantially parallel to the down tube.

24. A collapsible wheeled vehicle as defined in claim 23 further characterized by a yoke connected to the top of the stem, means including a toggle carried by the post, a slot in the yoke for receiving the post when the post is in a substantially vertical position, and means on the yoke cooperating with the toggle enabling the toggle to releasably lock the post in the vertical position.

25. A wheeled vehicle comprising:

a head tube and a down tube connected together, a bottom bracket assembly connected to the down tube, a seat tube having its lower end mounted on the bottom bracket assembly, a chain stay having its forward end mounted on the bottom bracket assembly, and means including a cable assembly interconnecting the upper portion of the seat tube, the forward portion of the head tube and the rear portion of the chain stay.

26. A handle bar assembly for use on a wheeled vehicle having a head tube and a fork and stem mounted on the head tube for carrying the front wheel comprising:

a handle bar post and a bracket pivotally mounting the post at its lower end on the fork, and movable between an erect position wherein it extends upwardly from the bracket and a collapsed position wherein the post extends generally horizontally from the bracket, and a clamp assembly connected to the post and releasably locking onto the stem to hold the post in the erect position.

27. A head tube and handle bar assembly for wheeled vehicles comprising:

a head tube having a fork and stem mounted thereon, a bracket interconnected to the stem, a handle bar post pivotally connected at one end to the bracket and carrying a handle bar at the other end, and locking means including a tube generally parallel to and exterior of the head tube, interconnected to the post and releasably engaging the fork at a point remote from the bracket for releasably locking the post in the erect position.

28. A head tube and handle bar assembly as defined in claim 27 further characterized by said locking means tube telescopically connected to the post and extending downwardly below the bracket to interlock with the fork.

29. A handle bar assembly for use on a wheeled vehicle having a head tube and a fork and stem mounted on the head tube for carrying the front wheel comprising:

a handle bar post and a bracket pivotally mounting the post at its lower end on the fork, and movable between an erect position wherein it extends upwardly from the bracket and a collapsed position wherein the post extends generally horizontally from the bracket, and a clamp assembly connected to the post and releasably locking onto the stem to hold the post in the erect position, said bracket being rotatable on the fork about a horizontal axis and said post carrying handle bars that extend outwardly therefrom, said rotatable bracket enabling the post to be rotated about its longitudinal axis so that the handle bars lie in a generally vertical plane and enabling the post to extend rearwardly with respect to the head tube when the fork is reversed.

30. A handle bar assembly for use on a wheeled vehicle having a head tube and a fork and stem mounted on the head tube for carrying the front wheel comprising:

a handle bar post and a bracket pivotally mounting the post at its lower end on the fork, and movable between an erect position wherein it extends upwardly from the bracket and a collapsed position wherein it extends generally horizontally from the bracket, and a clamp assembly connected to the post and releasably locking onto the stem to hold the post in the erect position, said clamping assembly comprising a cable connected to the handle bar post and carrying a toggle handle, and a yoke mounted on the stem and having a groove to engage the toggle whereby the post is held erect when the toggle engages the groove.

31. In a wheeled vehicle frame having a down tube and a bracket mounted thereon, a seat post assembly comprising:

a lower post section pivotally mounted at its lower end on the bracket about a horizontal axis permitting said lower section to move from an erect position extending upwardly from the bracket to a collapsed position wherein it lies generally parallel to the down tube, an upper post section pivotally mounted at its lower end on the lower post section above the bracket and pivotable about a horizontal axis permitting said upper section to fold down upon the lower section and lie along the down tube, and locking means for immobilizing the pivotal connection between the lower and upper post sections.

32. A wheeled vehicle frame comprising:

a main frame member, a seat tube pivotally connected to the main frame member, a cable interconnecting the main frame member and the upper portion of the seat tube.

and a hinge interrupting the seat tube between the cable and the main frame member enabling the seat tube to move between an erect position wherein the seat tube is straight and held erect by the cable and a collapsed position wherein the tube is straight and lies along the main frame member, said hinge enabling the tube to fold as it collapses to relieve tension on the cable and passing over center to rigidify the post when the tube is erected.

* * * * *